J. A. WOOD.
ELECTRIC STORAGE BATTERY.
APPLICATION FILED JAN. 25, 1918.
1,282,159. Patented Oct. 22, 1918.
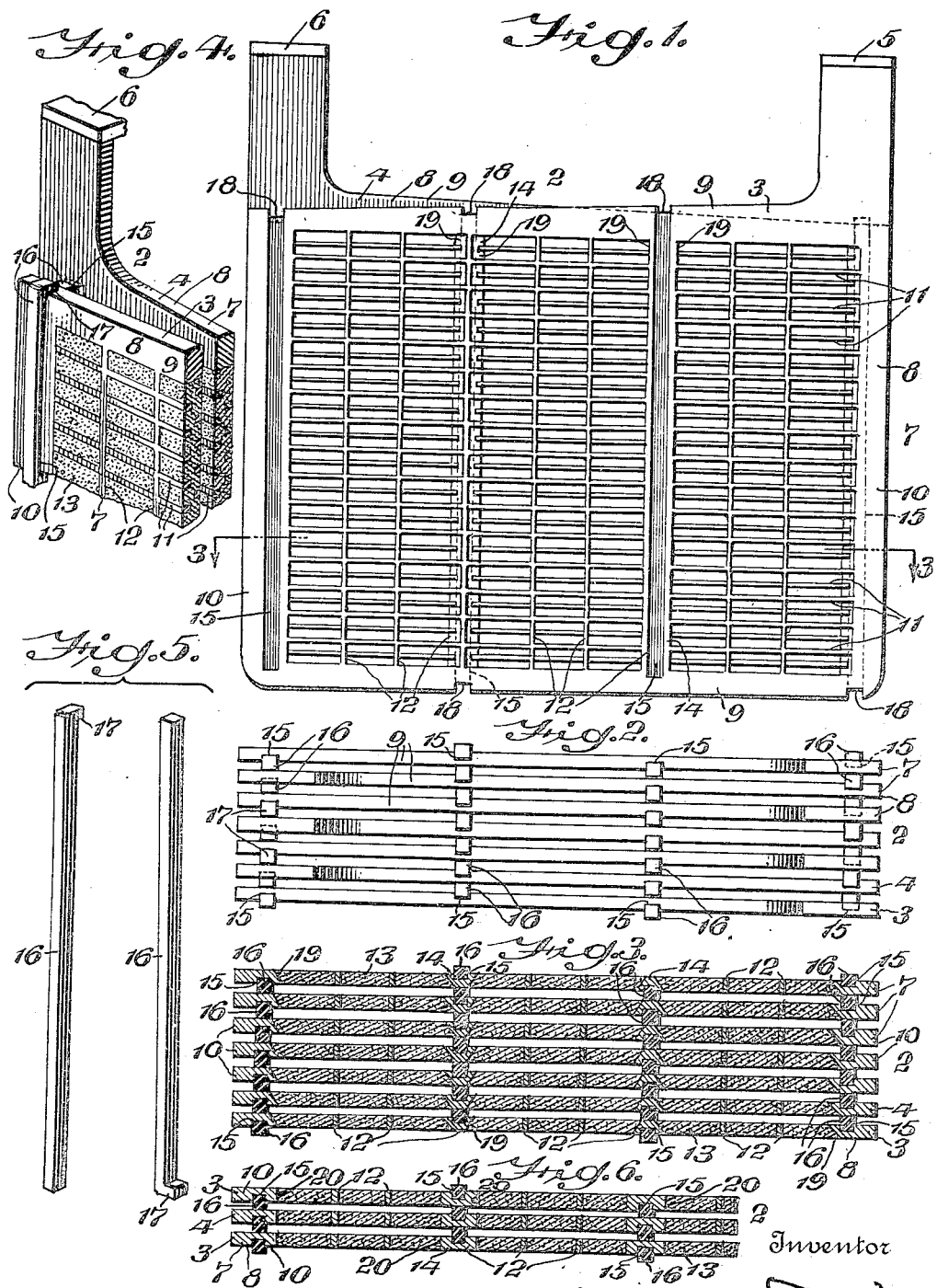

UNITED STATES PATENT OFFICE.

JAMES A. WOOD, OF PHILADELPHIA, PENNSYLVANIA, ASSIGNOR TO AUTOMOBILE ELECTRIC EQUIPMENT COMPANY, INC., OF PHILADELPHIA, PENNSYLVANIA, A CORPORATION OF DELAWARE.

ELECTRIC STORAGE BATTERY.

1,282,159.  Specification of Letters Patent.  Patented Oct. 22, 1918.

Application filed January 25, 1918. Serial No. 213,676.

*To all whom it may concern:*

Be it known that I, JAMES A. WOOD, a citizen of the United States, residing in the city and county of Philadelphia, State of Pennsylvania, have invented a new and useful Improvement in Electric Storage Batteries, of which the following is a specification.

My invention relates to certain improvements in electric storage batteries, the principal object thereof being to provide a novel construction of an electrode grid and non-metallic acid resistant insulating means therefor that will effectually separate and insulate the positive from the negative plates in the formation of the battery and allow the acid to come in direct contact with the active material of the electrode thereby increasing the efficiency of the battery.

A further object of my invention is to provide an electrode grid provided with means for retaining in the faces of the grid at certain intervals, non-metallic acid resistant separator chocks in the formation of the battery, the retaining means so arranged in the faces thereof to interchangeably adapt a single design of grid for use in connection with a positive or negative electrode in the assembly of the plates to form the battery.

A still further object of my invention is to provide a grid comprising a substantially rectangular framework, the confined portion thereof formed of intermeshing horizontal and vertical bars connected to the outer framework for supporting the active material on the grid, several of the intermediate vertical bars enlarged in cross section, said intermediate vertical bars and the end vertical bars of the framework having vertically extending grooves alternately arranged at equal intervals on the opposite faces of the plate for laterally retaining the separator strips of insulating material, preferably hard rubber, when the plates are assembled, also means for securing said separator strips over the edges of the plate to prevent vertical displacement of the strip in the operation of the battery.

For the purpose of illustrating my invention, I have shown in the accompanying drawings an embodiment which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevational view of several of the electrodes assembled showing my improved grid, the active material and the separator strips removed therefrom for the purpose of clearness.

Fig. 2 represents a top plan view of Fig. 1 with the attaching strap for the positive and negative plates removed.

Fig. 3 represents a section on the line 3—3 of Fig. 1.

Fig. 4 represents a fragmentary detail perspective view of two grid plates of negative and positive denomination in assembled relation to each other.

Fig. 5 represents several insulating separator strips or chocks composed of a non-metallic material, preferably hard rubber, substantially unaffected by the acid of the battery.

Fig. 6 represents a fragmentary section similar to Fig. 3 showing a modified formation of the intermediate vertical grooved bars.

Similar numerals of reference indicate corresponding parts in the figures.

Referring to the drawings:

2 designates a series of assembled positive and negative plates 3 and 4, the positive plates are supported together by the strap 5 while the negative plates are supported together by the strap 6.

7 designates my novel construction of a grid, see Figs. 1 and 3, which is formed of the substantially rectangular framework 8 consisting of the top and bottom horizontal bars 9 and the end vertical bars 10. The confined space between the bars 9 and 10 is made up of a network of intermeshing horizontal and vertical bars 11 and 12 connecting with the bars 9 and 10, this network serving as a supporting means for a filler of active agent 13, preferably a spongy lead, with the grid to form the electrode. The horizontal bars 11 are alternately staggered on the opposite faces of the grid, see Fig. 4, for more effectively supporting and retaining the active material with the grid as a unitary structure.

In carrying out my invention several of the vertical bars 12 are enlarged in horizontal section, as at 14, see Figs. 1 and 3. These bars together with the end vertical bars 10 have vertically extending grooves 15 they being formed directly in the grid plates and receiving the chocks or strips 16. As an additional feature said grooves are formed alternately in the opposite faces of the grid and each is occupied by such chock or strip.

These chocks 16 are composed of a nonmetallic material, preferably semi-hard rubber which is substantially unaffected by the acid of the battery.

The chocks are of a greater thickness than the depth of the grooves in order that the chocks when inserted in the grooves shall protrude beyond the face of the grid, see Fig. 3, in order that an effective separation and insulation is had between the positive and negative plates of the battery without the employment of separate separating plates for such purpose.

After the positive and negative electrodes are assembled and all the chocks are inserted in the grooves, it is most desirable to form or bend the ends of the chocks with angular heads 17 to engage in the recesses 18 formed in the upper and lower edges of the plate, thereby insuring the chocks against vertical displacement, while the vertical retaining grooves 9 hold the chocks against lateral movement with respect to the assembled electrodes.

The end walls 19 of the enlarged vertical bars 12 and the inner walls of the end bars 10, see Fig. 3, converge from the face of the plate in which the groove is formed, this design assuring the proper strength for the grooved members without materially detracting from the capacity of the plate for the active material.

In the modified embodiment seen in Fig. 6 the end walls 20 of the enlarged vertical bars 12 and the inner walls of the end bars 10 are parallel with each other.

It will therefore be understood that I have produced a novel design of an electrode and grid therefor wherein a nonmetallic acid resistant insulating means preferably semi-hard rubber is securely retained between the plates and arranged at proper intervals on and protruding from both faces of the plates in such a manner as heretofore described to make a single design of grid interchangeable for use in connection with a negative or positive electrode in the assembly of a series of electrodes to form an electric storage battery.

It will now be apparent that I have devised a novel and useful construction of electric storage batteries which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. An electrode for a storage battery comprising a metallic grid for supporting the active material of the electrode, said grid having directly therein a groove, and a nonmetallic separating member adapted to occupy said grooves and protrude beyond the face of the grid.

2. An electrode for storage batteries, comprising a metallic grid for supporting the active material of said electrode, said grid having grooves in the opposite faces thereof and extending below the surface of said faces for the reception of non-metallic insulating separators adapted to protrude beyond the faces of said grid.

3. An electrode for storage batteries, comprising a metallic grid for supporting the active material of said electrode, said grid having vertical grooves alternately arranged equal distances apart in the opposite faces thereof and extending below the surface of said faces for the reception of non-metallic insulating separator strips adapted to protrude beyond the faces of said grid.

4. An electrode for storage batteries, comprising a metallic grid for supporting the active material of said electrode, said grid having vertical grooves and extending below the surface of said faces for the reception of non-metallic insulating separator strips adapted to protrude beyond the faces of said grid, the upper and lower edges of said grid having recesses therein in alinement with said grooves for the reception of the upper and lower ends of said insulating separator strips.

5. An electrode for storage batteries, comprising a metallic grid for supporting the active material of said electrode, said grid having vertical grooves formed in the material of the body and alternately arranged equal distances apart in the opposite faces thereof and extending below the surfaces of said faces for the reception of non-metallic insulating separator strips adapted to protrude beyond the faces of said grid, said grid having recesses formed in the material of the body thereof at the upper and lower edges thereof, said recesses being in alinement with the grooves in the body for the reception of the upper and lower ends of said insulating separator strips.

6. In a storage battery, a series of positive and negative electrodes, each electrode comprising a metallic grid for supporting the active material of said electrode, said grid having vertical grooves therein spaced at substantially equal distances from each other and formed in opposite faces of the plate, the grooves on one face alternating with the grooves on the other face and extending below the surface of said faces, in combination with insulating chocks retained in said grooves between the plates and of sufficient thickness to protrude therefrom and separate said plates, said chocks composed of a non-metallic material substantially unaffected by the acid of the battery.

7. In a storage battery, a series of positive and negative electrodes, each electrode comprising a single metallic grid consisting of a substantially rectangular shaped framework, the confined portion thereof interlaced with a plurality of horizontal and vertical bars for supporting the active material on said grid, several of said vertical bars enlarged in cross section, the end vertical bars of said framework and the said enlarged vertical bars having vertical grooves therein in combination with chocks composed of non-metallic acid-resistant material retained in said grooves against lateral movement with respect to said electrodes and projecting beyond the faces of said plate.

8. In a storage battery, a series of positive and negative electrodes, each electrode comprising a metallic grid consisting of a substantially rectangular shaped framework formed of a top and bottom horizontal bar and end vertical bars connected therewith, the confined portion of said framework interlaced with a plurality of intermeshing horizontal and vertical bars connected to said framework for supporting the active material on said plate, several of the vertical bars intermediate the end bars broadened on the opposite faces of the plate and formed with converging end walls, the inner walls of said end bars converging from the opposite faces of the plate, said intermediate vertical bars and said end vertical bars having therein grooves in combination with insulating chocks composed of non-metallic insulating strips retained in said grooves and protruding beyond the faces of said plate to separate said electrodes, the ends of said chocks adapted to be formed into angularly disposed heads adapted to engage in recesses formed in the upper and lower edges of the plate to prevent vertical displacement of the chocks with respect to said electrodes.

JAMES A. WOOD.

Witnesses:
JOHN A. WIEDERSHEIM,
N. BUSSINGER.